(12) United States Patent  
Smithson et al.

(10) Patent No.: US 6,735,999 B2  
(45) Date of Patent: May 18, 2004

(54) CALIBRATION SPRING ADJUSTER FOR A SEAT BELT SYSTEM

(75) Inventors: Alan George Smithson, Corby Hill (GB); Paul Ian Henderson, Carlisle (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 127 days.

(21) Appl. No.: 10/302,877

(22) Filed: Nov. 25, 2002

(65) Prior Publication Data

US 2004/0040367 A1 Mar. 4, 2004

(30) Foreign Application Priority Data

Sep. 2, 2002 (EP) .............................................. 02256092

(51) Int. Cl.[7] .............................. G01L 25/00; G01L 5/04
(52) U.S. Cl. ................................... 73/1.15; 73/862.391
(58) Field of Search ......................... 73/1.15, 159, 826, 73/862.391, 862.392, 862.393; 701/45

(56) References Cited

U.S. PATENT DOCUMENTS

| | | | | |
|---|---|---|---|---|
| 2,323,965 A | * | 7/1943 | Anglada ................... | 123/90.53 |
| 3,552,410 A | * | 1/1971 | Amtsberg ................... | 137/56 |
| 4,086,809 A | * | 5/1978 | Wu et al. ...................... | 73/161 |
| 4,667,514 A | * | 5/1987 | Baer ............................ | 73/386 |
| 5,400,145 A | | 3/1995 | Suita et al. ................. | 356/401 |
| 5,791,448 A | * | 8/1998 | Gochenour et al. ...... | 192/70.25 |
| 5,960,523 A | * | 10/1999 | Husby et al. ................. | 24/633 |
| 6,081,759 A | * | 6/2000 | Husby et al. ................. | 701/45 |
| 6,230,088 B1 | * | 5/2001 | Husby .......................... | 701/45 |
| 6,284,987 B1 | * | 9/2001 | Al-Modiny ................. | 177/170 |
| 6,400,145 B1 | * | 6/2002 | Chamings et al. ...... | 324/207.26 |
| 6,508,114 B2 | * | 1/2003 | Lawson ........................ | 73/159 |
| 6,609,407 B1 | * | 8/2003 | Tambini ...................... | 73/1.11 |
| 2003/0042336 A1 | * | 3/2003 | Wuttke et al. .............. | 239/569 |

* cited by examiner

*Primary Examiner*—Hezron Williams
*Assistant Examiner*—C D Garber
(74) *Attorney, Agent, or Firm*—Lonnie R. Drayer

(57) ABSTRACT

A calibration spring tension adjuster for a seat belt tension sensor has a calibration spring, and a holder. The fixed part and the movable part are adjacent to each other and comprise mutually facing stepped helical faces arranged so that the movable part can be rotated relative to the fixed part causing the steps to slide over each other causing a gap between the stepped faces to increase and compressing the spring. The steps can be arranged so that movement of the movable part in one direction is resisted. The holder is arranged to attach to the fixed part and the spring is held between an abutment face of the holder and a non-stepped face of the movable part.

20 Claims, 4 Drawing Sheets

CALIBRATION SPRING ADJUSTER FOR A SEAT BELT SYSTEM

FIELD OF THE INVENTION

The present invention relates to a calibration spring adjuster for a seat belt tension sensor.

BACKGROUND OF THE INVENTION

Seat belt tension sensors are required to assist in distinguishing between an adult occupant of a front passenger seat and a child in a child seat occupying the seat, so as to control the deployment of the passenger airbag appropriately.

It is known to use a weight sensor in the front passenger seat to detect the weight of adult occupants and thereby control the deployment of the airbag appropriately to the weight of the seat occupant. The signal from the weight sensor is sent to an electronic control unit (ECU) which controls the airbag as a consequence. However, there have been erroneous outputs indicative of an adult occupant when only a child in a child seat is occupying the vehicle seat, particularly if the seat belt is pulled very tight around the frame of the child seat. It is of course preferable to secure the child seat as tightly as possible and some seat belts have a "child hold out mechanism" (CHOM) to accomplish this effectively. A normal modern seat belt mechanism allows limited movement of the seat occupant, for example to reach the vehicle radio or the glove compartment, and only locks the belt when a crash is sensed. Such a mechanism is more comfortable than a fixed locked system. A CHOM mechanism disables this "inertia" mechanism and locks the retractor permanently allowing the belt to be tightened securely around a child seat. However the more the belt is tightened the greater the possibility that the weight sensor will provide a signal to the ECU indicating that an adult is occupying the seat.

DISCUSSION OF THE PRIOR ART

A belt tension sensor (SBTS) may be provided in the line of force on the seat belt. This gives an output proportional to the load on the seat belt and provides the signal to the ECU. If the ECU receives an "adult weight" signal and a high belt tension signal then it knows that the apparent weight in the front seat is due to a child seat being fastened tightly rather than to an adult seat occupant and will disable the airbag. Such a sensor is located either between the belt buckle and the vehicle body, or between the end of the seat belt and the vehicle body. It comprises a calibration spring to control its output and it is important that the preload in this spring is set correctly. The calibration spring preload is set using an adjuster is made after assembly of the complete sensor mechanism with the nut being locked onto the screw by ultrasonic welding. Such a sensor is described in U.S. Pat. No. 5,400,145. This has several disadvantages in that the spring preload cannot be measured in the full sensor assembly and access for adjustment and welding devices is extremely limited. Also adjustment must take place in the main assembly process flow and tends to increase the production. It is an object of the present invention to provide an improved in the spring.

SUMMARY OF THE INVENTION

There is provided by the present invention a calibration spring tension adjuster for a seat belt tension sensor comprising a fixed part, a movable part, a holder attached to the fixed part, and a calibration spring held between the holder and the movable part, wherein the fixed part and the movable part are adjacent to each other and comprise mutually facing stepped helical faces arranged so that the movable part can be rotated relative to the fixed part causing the respective stepped helical faces to slide over each other to change a gap between the stepped helical faces and tension the calibration spring.

DETAILED DESCRIPTION OF THE INVENTION

Figure 1:
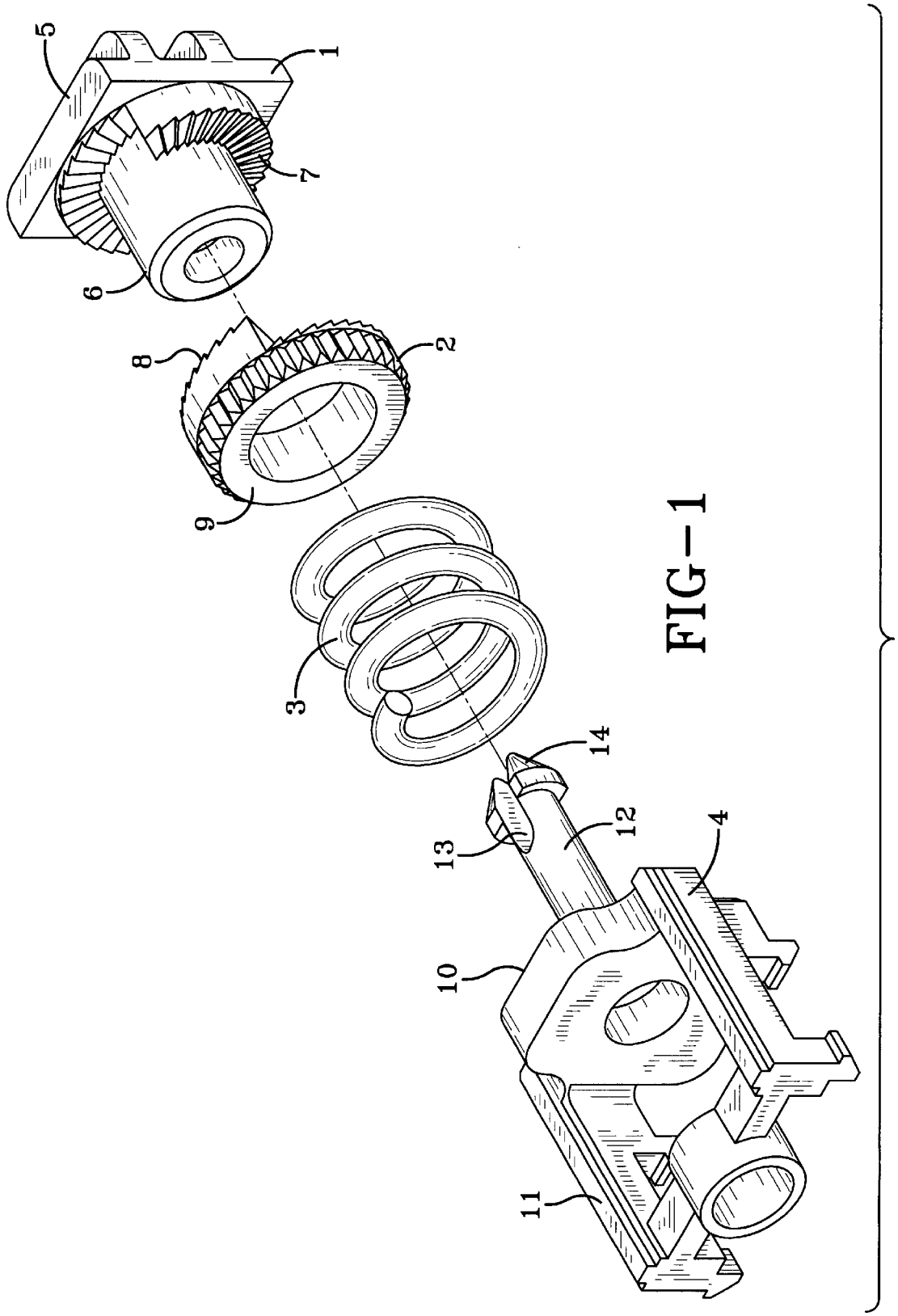
FIG. 1 is an exploded view of the parts of a seat belt tension sensor according to one aspect of the present invention.

FIG. 1 shows a seat belt tension sensor comprising a fixed part 1, a movable part 2, a spring 3 and a holder 4. Preferably the fixed part, the movable part and the holder are all formed of injection molded plastic material. The fixed part 1 has a base 5 from which rises a hollow cylindrical part 6 surrounded by a helical steeped portion 7. A complementary shaped helical stepped portion 8 forms part of the movable part 2 that is a hollow ring. The face 9 opposite to the stepped portion 8 forms a first bearing surface for one end of the spring 3. The spring 3 is a helical compression spring and the other end bears against a second bearing surface 10 on the holder 4. Preferably the steps are arranged so that movement of the movable part in one direction is resisted. The change may be an increase in the size of the gap to compress the spring. Each step may be approximately 0.1 mm high and equivalent to 7.5 degrees of rotation in length.

The holder 4 is a magnet holder and has a frame 11 into which a magnet or magnets (not shown) can be secured. These magnets are used to operate the sensor and are not affected by or part of the preload adjustment system. Extending from the bearing surface 10 is a rod 12 at the end of which is a longitudinally split section 13 terminating in a two part arrow head 14. This split section allows the end of the rod 12 to be inserted into the hollow cylinder 6 of the fixed part and the arrow head 14 catches on a shoulder 15 (see FIG. 3) inside the hollow to lock the parts of the sensor together. This can also be achieved by use of other types of clips or a bayonet type of fitting. According to a preferred embodiment the holder comprises a spring abutment surface with a rod extending therefrom to pass through the middle of the spring and the distal end of the rod has a fastening element to fix it to the fixed part. The fastening element may be a split tapering head with two parts resiliently set apart. The spring may be a coiled compression spring.

Figure 2:
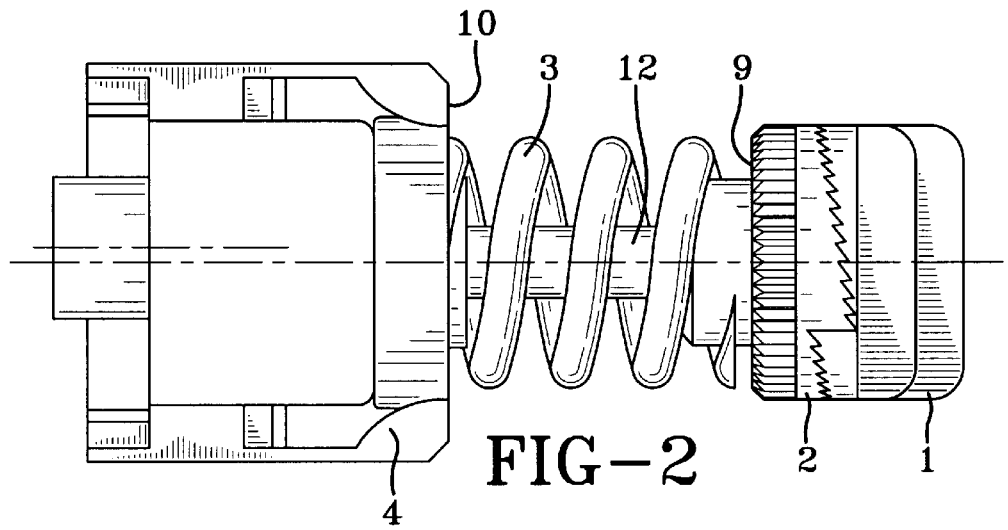
FIG. 2 is an assembled view of the seat belt tension sensor of FIG. 1.

In FIG. 2 the parts are shown assembled together with the spring 3 not yet tensioned between the first bearing surface 9 of the movable part 2 and the second bearing surface 10 of the housing 4. The movable part 2 is shown in its lowest position and is ready to be rotated until its face 9 contacts the spring and then compresses it to the desired preload.

Figure 3:
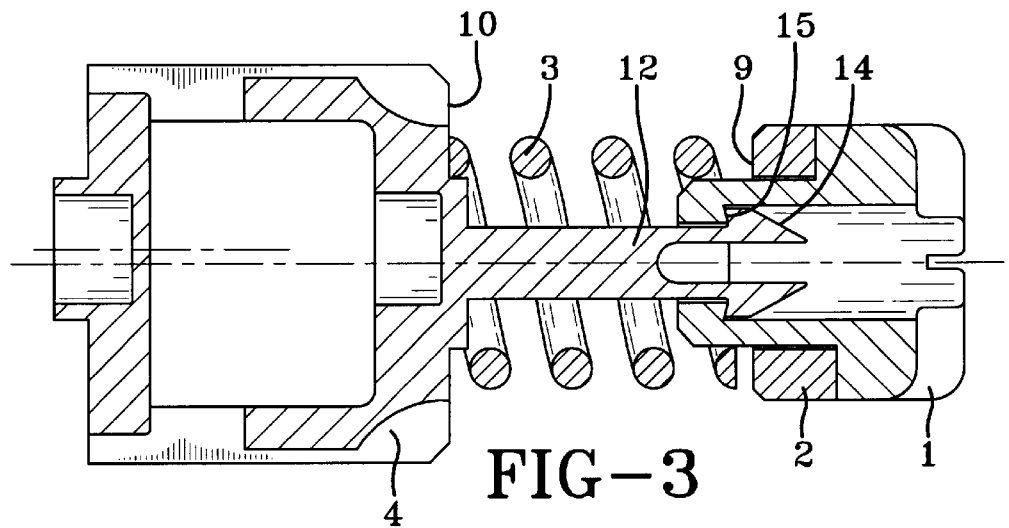
FIG. 3 is a cross sectional view of the sensor of FIGS. 1 and 2 taken in the plane of the paper.
Figure 4:
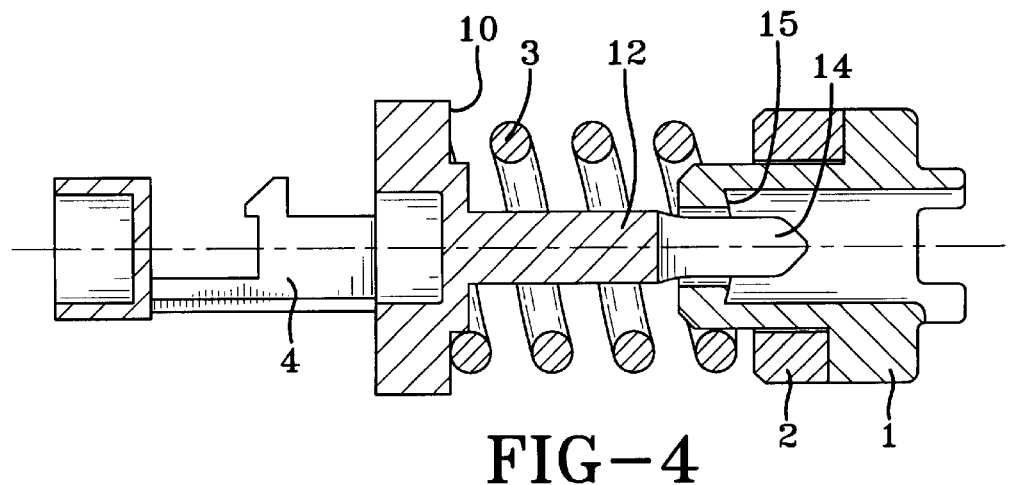
FIG. 4 is a cross sectional view of the sensor of FIGS. 1 and 2 taken orthogonal to the plane of the paper.

FIG. 3 is a cross sectional view of FIG. 2 showing how the arrow head 14 engages in the hollow cylinder 6 and catches against the shoulder 15. The rod 12 of the housing 4 passes through the middle of the spring 3.

Figure 5:
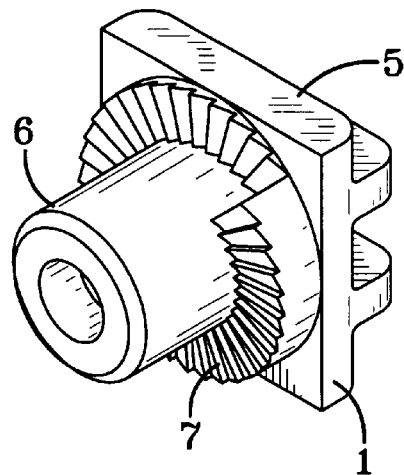
FIGS. 5 to 9 are sequential assembly views of a seat belt tension sensor illustrating the method of the second aspect of the invention.
Figure 6:
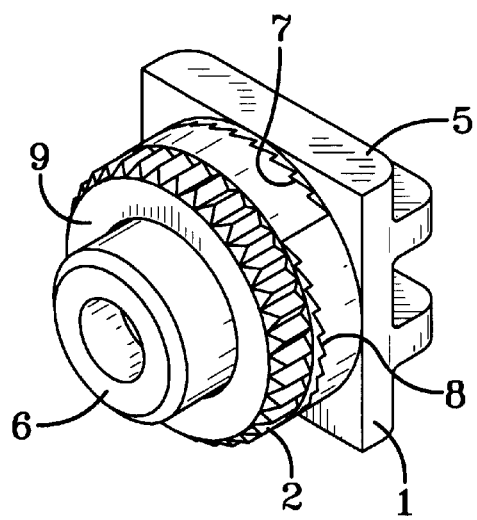
Figure 7:
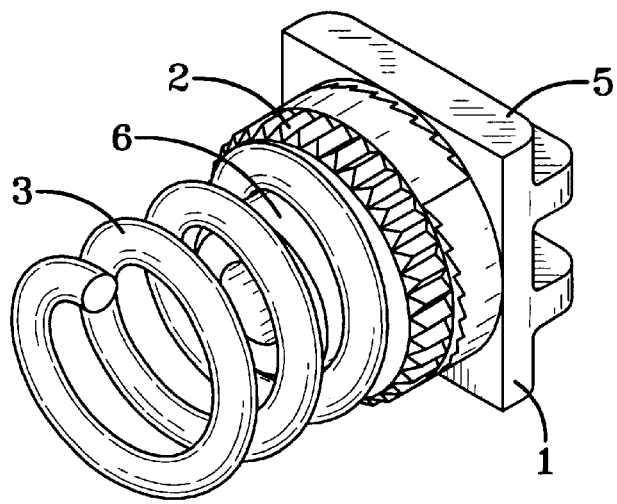
Figure 8:
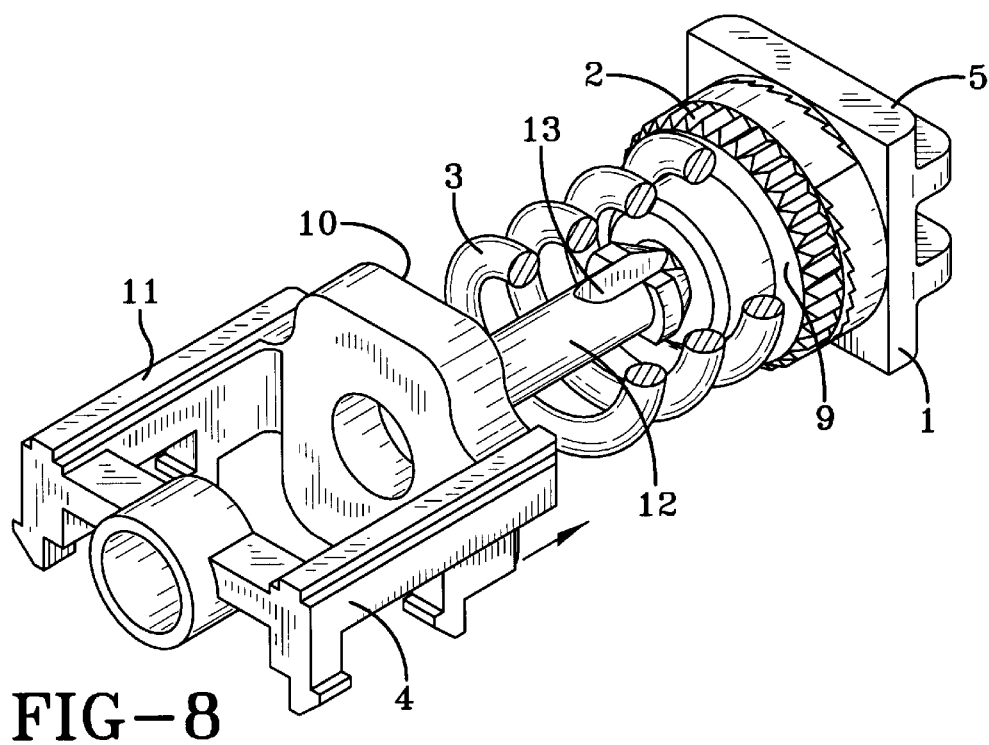
Figure 9:
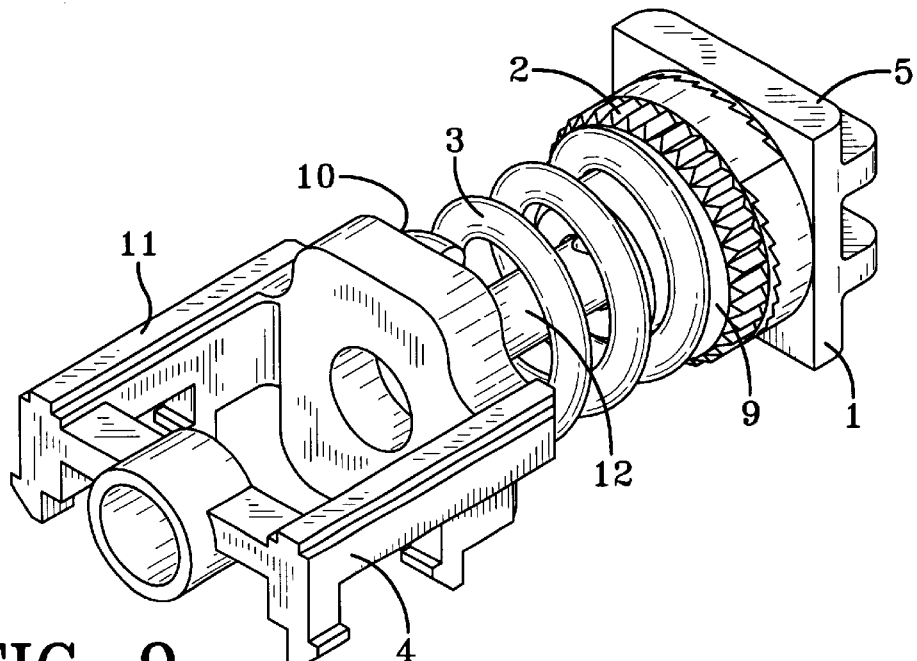

The parts of the sub-assembly are put together as shown in FIGS. 5 to 9. In FIG. 5 the fixed part 1 is shown on its own. In FIG. 6 the movable part 2 is placed onto the fixed part 1 with the stepped faces abutting in the lowest setting position. Then the spring 3 is added so that one end abuts the first bearing surface 9, as shown in FIG. 7. Subsequently the housing 4 is attached by pushing the rod 12 through the middle of the spring 3 and into the hollow cylinder 6 of the fixed part 1. As the rod 12 is pushed into the hollow, the two parts of the arrow head 14 are squeezed together and as they pass through into the inside of the cylinder they catch on the should 15 and secure the parts together to form a sub-assembly.

Finally the sub-assembly is calibrated. To set the preload for the spring 3 the sub-assembly is mounted in a test jig having a pre-defined dimension between the sub-assembly datum positions, and a load cell is fitted to the jig. Then the movable part 2 is rotated relative to the fixed part 1 so that the steps ride over the corresponding steps on the fixed part 1 one by one. This may be audible to the assembler as a series of clicks. Each step or "click" represents 0.1 mm of spring compression and 7.5 degrees of rotation. The movable part 2 is rotated until the appropriate pre-load is attained. If the movable part 2 is rotated too far and the pe-load is too high then the starting position can be refound by rotating the movable part 2 further in the spring compression direction, eg in this example through 120 degrees from its original assembled position. The calibrated sub-assembly is then stored for later assembly into full sensor units.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. Thus, the scope of the invention is not limited to the disclosed embodiments.

We claim:

1. A calibration spring tension adjuster for a seat belt tension sensor comprising a fixed part, a movable part, a holder attached to the fixed part, and a calibration spring held between the holder and the movable part, wherein the fixed part and the movable part are adjacent to each other and comprise mutually facing stepped helical faces arranged so that the movable part can be rotated relative to the fixed part causing the respective stepped helical faces to slide over each other to change a gap between the stepped helical faces and tension the calibration spring.

2. The calibration spring tension adjuster for a seat belt tension sensor according to claim 1 wherein the stepped helical faces are arranged so that movement of the movable part in one direction is resisted.

3. The calibration spring tension adjuster for a seat belt tension sensor adjuster according to claim 1 wherein the fixed part and the movable part are formed of injection molded plastic material.

4. The calibration spring tension adjuster for a seat belt tension sensor according to claim 1 wherein the holder is formed of injection molded plastic material.

5. The calibration spring tension adjuster for a seat belt tension sensor according to claim 1 wherein the holder comprises a spring abutment surface with a rod extending therefrom to pass through the middle of the spring and the distal end of the rod has a fastening element to fix it to the fixed part.

6. The calibration spring tension adjuster for a seat belt tension sensor according to claim 2 wherein the holder comprises a spring abutment surface with a rod extending therefrom to pass through the middle of the spring and the distal end of the rod has a fastening element to fix it to the fixed part.

7. The calibration spring tension adjuster for a seat belt tension sensor according to claim 1 wherein the spring is a coiled compression spring, tensioned by increasing the gap between the respective stepped helical faces.

8. The calibration spring tension adjuster for a seat belt tension sensor according to claim 5 wherein the spring is a coiled compression spring, tensioned by increasing the gap between the respective stepped helical faces.

9. The calibration spring tension adjuster for a seat belt tension sensor according to claim 6 wherein the spring is a coiled compression spring, tensioned by increasing the gap between the respective stepped helical faces.

10. The calibration spring tension adjuster for a seat belt tension sensor according to claim 1 wherein the fastening element is a split tapering head with two parts resiliently set apart.

11. The calibration spring tension adjuster for a seat belt tension sensor according to claim 2 wherein the fastening element is a split tapering head with two parts resiliently set apart.

12. The calibration spring tension adjuster for a seat belt tension sensor according to claim 5 wherein the fastening element is a split tapering head with two parts resiliently set apart.

13. The calibration spring tension adjuster for a seat belt tension sensor according to claim 6 wherein the fastening element is a split tapering head with two parts resiliently set apart.

14. The calibration spring tension adjuster for a seat belt tension sensor according to claim 7 wherein the fastening element is a split tapering head with two parts resiliently set apart.

15. The calibration spring tension adjuster for a seat belt tension sensor according to claim 8 wherein the fastening element is a split tapering head with two parts resiliently set apart.

16. The calibration spring tension adjuster for a seat belt tension sensor according to claim 9 wherein the fastening element is a split tapering head with two parts resiliently set apart.

17. The calibration spring tension adjuster for a seat belt tension sensor according to claim 1 wherein a step of the stepped helical faces is about 0.1 mm high and equivalent to 7.5 degrees of rotation in length.

18. The calibration spring tension adjuster for a seat belt tension sensor according to claim 2 wherein a step of the stepped helical faces is about 0.1 mm high and equivalent to 7.5 degrees of rotation in length.

19. The calibration spring tension adjuster for a seat belt tension sensor according to claim 5 wherein a step of the stepped helical faces is about 0.1 mm high and equivalent to 7.5 degrees of rotation in length.

20. The calibration spring tension adjuster for a seat belt tension sensor according to claim 6 wherein a step of the stepped helical faces is about 0.1 mm high and equivalent to 7.5 degrees of rotation in length.

* * * * *